United States Patent
Gulati et al.

(10) Patent No.: US 11,522,670 B2
(45) Date of Patent: Dec. 6, 2022

(54) PYRAMID CONSTRUCT WITH TRUSTED SCORE VALIDATION

(71) Applicant: MaataData, Inc., Fremont, CA (US)

(72) Inventors: Anjali Gulati, Fremont, CA (US); Phillipus Van Eeden, Fremont, CA (US)

(73) Assignee: MAATADATA, INC., Fremont, CA (US)

( * ) Notice: Subject to any disclaimer, the term of this patent is extended or adjusted under 35 U.S.C. 154(b) by 143 days.

(21) Appl. No.: 17/108,181

(22) Filed: Dec. 1, 2020

(65) Prior Publication Data
US 2021/0176036 A1 Jun. 10, 2021

Related U.S. Application Data

(60) Provisional application No. 62/943,584, filed on Dec. 4, 2019.

(51) Int. Cl.
*H04L 9/00* (2022.01)
*H04L 9/32* (2006.01)
*H04L 9/08* (2006.01)

(52) U.S. Cl.
CPC ............ *H04L 9/007* (2013.01); *H04L 9/0825* (2013.01); *H04L 9/0836* (2013.01); *H04L 9/3236* (2013.01); *H04L 9/50* (2022.05)

(58) Field of Classification Search
CPC ..... H04L 9/007; H04L 9/0825; H04L 9/0836; H04L 9/3236; H04L 9/50; H04L 9/3247; H04L 63/12; H04L 9/3239
See application file for complete search history.

(56) References Cited

U.S. PATENT DOCUMENTS

| | | | |
|---|---|---|---|
| 11,243,917 B2* | 2/2022 | Kamijoh | G06F 16/1805 |
| 2006/0212930 A1* | 9/2006 | Shull | G06F 21/577 |
| | | | 726/10 |
| 2010/0287151 A1* | 11/2010 | Mustonen | H04L 63/1441 |
| | | | 707/706 |
| 2013/0317941 A1* | 11/2013 | Stoll | G06Q 30/0609 |
| | | | 705/26.35 |

(Continued)

FOREIGN PATENT DOCUMENTS

| | | |
|---|---|---|
| EP | 3249599 A1 | 11/2017 |
| WO | WO-2018224954 A1 | 12/2018 |

(Continued)

OTHER PUBLICATIONS

Di Pietro et al.; "A blockchain-based Trust System for the Intenet of Things", Jun. 2018, ACM, pp. 77-83. (Year: 2018).*

(Continued)

*Primary Examiner* — Matthew Smithers
(74) *Attorney, Agent, or Firm* — Wilson Sonsini Goodrich & Rosati

(57) ABSTRACT

Disclosed herein are systems and methods for decentralized data distribution by a database network system comprising a hierarchical blockchain model. The hierarchical blockchain model may comprise a quantum pyramid consensus to distribute data throughout the database network system in a decentralized and secure manner. The hierarchical construct may be built according to trusted scores calculated for the nodes of the network over their lifetime at the network.

7 Claims, 2 Drawing Sheets

(56) References Cited

U.S. PATENT DOCUMENTS

| | | | |
|---|---|---|---|
| 2018/0041571 A1* | 2/2018 | Rogers | G06F 16/48 |
| 2018/0158034 A1 | 6/2018 | Hunt et al. | |
| 2018/0219669 A1 | 8/2018 | Chen et al. | |
| 2019/0058590 A1 | 2/2019 | Watanabe et al. | |
| 2019/0066119 A1* | 2/2019 | Sengupta | G06Q 20/4016 |
| 2019/0173666 A1 | 6/2019 | Ardashev et al. | |
| 2019/0190896 A1 | 6/2019 | Singh | |
| 2019/0279210 A1 | 9/2019 | Pen | |
| 2019/0349733 A1* | 11/2019 | Nolan | H04L 69/22 |
| 2019/0354723 A1* | 11/2019 | Dassenno | H04L 9/3239 |
| 2020/0007313 A1* | 1/2020 | Vouk | H04L 9/3239 |
| 2020/0119926 A1* | 4/2020 | Buki | G06Q 20/401 |
| 2020/0186509 A1* | 6/2020 | Kursun | H04L 63/1466 |
| 2021/0250812 A1* | 8/2021 | Caswell | H04L 41/122 |
| 2022/0027903 A1* | 1/2022 | Wright | H04L 9/0825 |

FOREIGN PATENT DOCUMENTS

| | | | | |
|---|---|---|---|---|
| WO | WO-2019116250 A1 | | 6/2019 | |
| WO | WO-2019161412 A1 * | | 8/2019 | G06Q 20/02 |

OTHER PUBLICATIONS

PCT/US2020/063154 Search Report & Written Opinion dated Mar. 11, 2021.
Blockchain Demo Night Petavalue—Blockchain Founder Club. YouTube. Uploaded by SVE Founder Club Jun. 9, 2018. https://www.youtube.com/watch?v=eAND6hFEBzc.
Sahoo et al. A hierarchical and abstraction-based blockchain model. Appl. Sci. Sep. 2019, 2343.

\* cited by examiner

PYRAMID CONSTRUCT WITH TRUSTED SCORE VALIDATION

CROSS-REFERENCE

This application claims the benefit of U.S. Provisional Patent App. No. 62/943,584, filed Dec. 4, 2019, which is entirely incorporated herein by reference for all purposes.

BACKGROUND

The present disclosure relates generally to decentralized database networks, such as blockchain networks. Provided herein is a database network system for decentralized data distribution. Methods and systems may comprise a hierarchical blockchain model for decentralized data distribution and security mechanisms for secured data distribution in decentralized networks.

SUMMARY

Recognized herein is a need for systems and methods for secure, efficient, and decentralized data distribution to a plurality of nodes.

In an aspect, the present disclosure provides a database network system for decentralized data distribution, comprising: a plurality of nodes communicating in a hierarchical construct based on a trusted score assigned to each node of the plurality of nodes. A node of the plurality of nodes in the hierarchical construct may be configured to receive a data block from a parent node and distribute the data block to at least two child nodes. The parent node may have a higher trusted score than the node and the node may have a higher trusted score than each of the at least two child nodes. The node may be configured to validate the data block based on one or more trusted scores of one or more nodes in an upstream distribution path of the data block. Each of the plurality of nodes may comprise a copy of the hierarchical construct.

In some embodiments, the data block may comprise a cryptographic hash of a previous data block in a blockchain network which may comprise the previous data block and the data block. The node may be configured to further validate the data block based on the cryptographic hash. In some embodiments, the node may be configured to distribute the data block to at most two child nodes.

In some embodiments, the data block may be signed by a user private key. The user private key may be configured for verification by a user public key. The user public key may be stored on a blockchain network. Each node of the plurality of nodes may be configured to verify the user private key using the user public key. In some embodiments, the data block may be signed by an application private key. The application private key may be configured for verification by an application public key. The application public key may be stored on the blockchain network, and each node of the plurality of nodes may be configured to verify the application private key using the application public key.

In an aspect, the present disclosure provides a database network system for decentralized data distribution, comprising: a plurality of nodes communicating in a dynamic hierarchical construct comprising a top node. A node of the plurality of nodes in the dynamic hierarchical construct may be configured to receive a data block from a parent node and distribute the data block to at least two child nodes. The node may be configured to validate the data block based on an upstream distribution path of the data block to the top node.

The dynamic hierarchical construct may be configured to change the top node with each data block. Each of the plurality of nodes comprises a copy of the dynamic hierarchical construct.

In some embodiments, the dynamic hierarchical construct may be based on a trusted score assigned to each node of the plurality of nodes. The parent node may have a higher trusted score than the node. The node may have a higher trusted score than each of the at least two child nodes. The node may be configured to validate the data block based on one or more trusted scores of one or more nodes in the upstream distribution path of the data block.

In some embodiments, the data block may comprise a cryptographic hash of a previous data block in a blockchain network comprising the previous data block and the data block. The node may be configured to further validate the data block based on the cryptographic hash. In some embodiments, the node may be configured to distribute the data block to at most two child nodes. In some embodiments, the data block may be signed by a user private key. The user private key may be configured for verification by a user public key. The user public key may be stored on a blockchain network. Each node of the plurality of nodes may be configured to verify the user private key using the user public key.

The data block may be signed by an application private key. The application private key may be configured for verification by an application public key. The application public key may be stored on the blockchain network, and each node of the plurality of nodes may be configured to verify the application private key using the application public key.

In another aspect, the present disclosure provides a method for constructing a database network system from a plurality of nodes for decentralized data distribution, comprising: (a) using a plurality of tests, assaying a computing power of each of the plurality of nodes substantially simultaneously, where each of the plurality of nodes may receive a different test of the plurality of tests; (b) determining a test score for each of the plurality of nodes based at least in part on the computing power determined in (a); (c) determining a trusted score for each of the plurality of nodes, where trusted score may be based at least in part on a sum of the test score and an accumulated trusted score for each of the plurality of nodes, if any; and (d) generating a hierarchical construct of the plurality of nodes. A node of the plurality of nodes in the hierarchical construct may be configured to receive a data block from a parent node and distribute the data block to at least two child nodes. The parent node may have a higher trusted score than the node and the node may have a higher trusted score than each of the at least two child nodes. In some embodiments, the method may further comprise repeating (a)-(d). The plurality of tests may be calculated by the plurality of nodes. Two tests of the plurality of tests provided to the at least two child nodes may be calculated by the node.

In some embodiments, the trusted score for the node may be based at least in part on a given test score for a child node of the at least two child nodes. In some embodiments, substantially simultaneously comprises less than 1 second. In some embodiments, the plurality of tests may comprise calculation of a total block hash based on random block numbers. In some embodiments, the method further comprises distributing the data block from the parent node to the node, and from the node to the at least two child nodes.

In some embodiments, the method further comprises validating the data block, by each of the plurality of nodes, based on one or more trusted scores of one or more nodes in an upstream distribution path of the data block.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
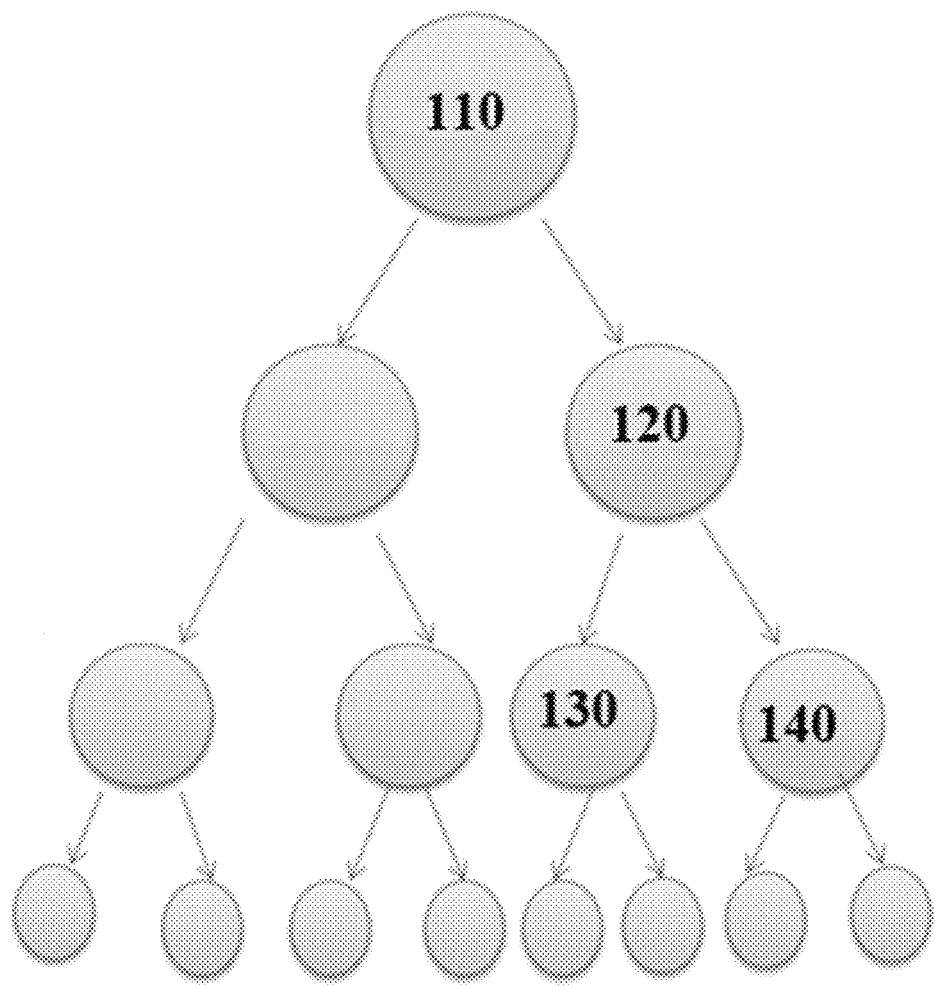
FIG. 1 illustrates an example pyramidal hierarchical construct which may be used to perform the methods of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "real-time" generally refers to transmitting or processing data without intentional delay given the processing limitations of a system, the time required to accurately obtain data, and the rate of change of the data. In some instances, real-time may refer to simultaneous or substantially simultaneous occurrence of one event relative to another event. In some instances, real-time may include a response time of less than 1 second, tenths of a second, hundredths of a second, a millisecond, or less.

The present disclosure provides a database network system for decentralized data distribution, and methods thereof. The database network system may comprise a hierarchical blockchain model.

Blockchain Models

A blockchain model may comprise a growing list of records, such as blocks, that may be linked and secured using cryptography. The database network system may be a distributed database system which may be collectively maintained by a plurality of nodes in a decentralized manner. The network may comprise a series of blocks which may be generated by, or with aid of, cryptography. The database network system may comprise or be an immutable digital public ledger. The database network system may be a continuously growing, distributed database. The distributed database may be cryptographically secured using the methods, procedures, and measures provided herein.

A blockchain may comprise one or more blocks. The one or more blocks may be associated with a sequence. Each block may contain a hash value of a previous block, a timestamp, and data (e.g., transaction data). The blockchain may be formed starting from a genesis block to a current block. The blocks may be generated in a chronological order, such that a hash value of the previous block may be known. In some cases, the blocks may be generated in a linear, chronological order. In some cases, blocks may be generated in a non-linear order or according to other patterns. The database network system may have substantially complete information from the genesis block to the most recently completed block.

In some cases, the database network system may store information comprising data in uniform-sized blocks. Each block may comprise hashed information from the previous block to provide cryptographic security. This may also be referred to as data hashing. Data hashing may comprise a hashing function. The hashed data and/or information may comprise the data and digital signatures, and/or keys (such as public key and/or private key) from the previous block, and the hashed information of the previous blocks that may go all the way back to the genesis block. The information may be distributed through a hash function which may then point to the address of the previous block. In some cases, the database network system may comprise a linked list that may comprise pointers. Blocks may store information validated by nodes that may be cryptographically secured according to the methods described herein.

The genesis block may be where the very first data in the network were generated. In some examples, the database network system may be a system of decentralized transactions and/or a system of decentralized trustless transactions. In some cases, the database network system may be a decentralized public ledger. For example, the database network system may stand as a trustless proof mechanism of all activities (such as transactions) on the network. Users may trust the system of the public ledger stored on many different decentralized nodes, in some cases worldwide, as opposed to establishing and maintaining trust with a counterparty, such as a transaction counterparty, such as another person, or a third-party intermediary (e.g., a bank).

The database network system may perform as another application layer to run on an existing stack of Internet protocols, adding a new tier to the Internet to enable activities such as performing economic transactions, currency payments such as digital currency payments, registering and maintaining financial contracts, transacting hard and/or soft assets, and more activities.

Further, the database network system may be used for activities beyond transactions, such as a registry and/or inventory system for recording, tracking, tracking, monitoring, and/or transacting of all assets. In some examples, the database network system may be like a ledger for registering assets, and/or an accounting system for transacting them on a global scale that can comprise all forms of assets held by parties worldwide. The database network system may be used for any form of asset registry, inventory, and exchange, comprising every area of finance, economics, money, hard assets (e.g., physical properties), intangible assets such as votes, ideas, reputation, intention, health data, personal data, media, and more.

In some cases, the database network system may be resistant to modification of data, or be immutable. The database network system may be an open and distributed ledger that can record transactions between two or more parties efficiently and in a verifiable way. Transactions may be recorded permanently. A blockchain may be managed by a network collectively adhering to a protocol (such as an algorithm) for inter-node communication and validation of new blocks. In some cases, once the data is recorded, the data in a given block cannot be altered retroactively without alteration of all subsequent blocks. Designs may be optimized such that they facilitate robust workflows where participants' uncertainty regarding data security may be marginal. The use of the database network system may remove the characteristic of infinite reproducibility from a digital asset. In some cases, it may confirm that each unit of value was transferred only once, solving the double-spending problem. For example, the transactions may be non-recursive and may not be prone to be repeated once validated in a block. The database network system may comprise a value-exchange protocol. The database network system may be capable of maintaining title rights, such that when properly set up to detail the exchange agreement, it may provide a record that compels offer and acceptance.

In some examples, the database network system may be public. Participants may be allowed to verify and audit transactions independently and relatively inexpensively. The database network system may be managed autonomously using a network and a distributed timestamping server. They may be authenticated by mass collaboration powered by collective self-interest.

Blocks may hold batches of valid transactions that may be hashed and encoded into a structure. Each block may include the cryptographic hash of the prior block in the database network system, which may link them. This process may be performed iteratively (e.g., repetitively, redundantly). The iterative process may confirm the integrity of the previous block, all the way back to the genesis block.

In some cases, separate blocks may be produced concurrently, creating a temporary fork. In addition to a secure hash-based history, the database network system may have a specified algorithm for scoring different versions of the history so that one with a higher score can be selected over others. Blocks not selected for inclusion in the chain may be called orphan blocks.

The database network system may comprise a plurality of nodes. A node may be an entity, such as a machine (e.g., computer or another processing device) which is connected to the blockchain network. A machine may be controlled by a user. A machine may be controlled by another machine. A node may comprise a computer system described elsewhere herein. Each node may be capable of performing or configured to perform the task of validating and relaying transactions in the network. In some instances, each node may have a copy of the network system, which in some cases, may be downloaded once a user joins the network. In some cases, the download may be automatic.

The database network system may facilitate decentralized data distribution. Data may be stored across the entire network. By storing data across the entire network, the database network system may help decrease a number of risks that may otherwise be associated with data being held centrally, such as in an example centralized network. In some cases, the decentralized database network system may use ad-hoc message passing and/or distributed networking. The database network system may lack centralized points of vulnerability that malicious third parties can exploit; likewise, in some cases, there may be no central point of failure. In some cases, the database network system may be more secure against vulnerabilities and external attacks compared to a centralized network. In some cases, the database network system provided herein may be more secure against external attacks compared to other decentralized networks such as other blockchain networks.

Hierarchical Network Constructs

A plurality of nodes in the database network system may communicate with each other directly or indirectly according to a given or defined structure, pattern, or construct. The communication of nodes with each other may facilitate distribution of data between the plurality of nodes throughout the network. The structure and/or construct may comprise or be a hierarchical model. A plurality of nodes in the database network system may communicate with each other in a hierarchical construct or according to a hierarchical construct.

The hierarchical construct may comprise multiple levels, such as hierarchical levels or levels of hierarchy. As used herein, the term "parent" may generally refer to a higher degree of hierarchical level relative to a "child" having a lower degree of hierarchical level within a hierarchical construct. In some cases, the hierarchical construct may comprise or be a binary construct, a pyramid construct, a quantum construct, and/or a quantum pyramid binary construct. In some cases, data may be stored in a single database. In some cases, the construct may be derived from an internal setup of the database. The construct may comprise or be an exponential structure, such as a tree. A network of nodes may function according to the hierarchical construct. The hierarchical construct may define a protocol and/or a distribution path for data transmission and/or inter-node communications and validations.

The network of nodes may be structured such that they provide a path for decentralized data distribution. In some cases, data distribution may progress exponentially. Data distribution may be somewhat efficient, efficient, substantially efficient, or highly efficient. In some cases, data distribution may be highly efficient. Data distribution may be more efficient and faster compared to a blockchain not comprising a hierarchical construct and/or nor comprising a quantum pyramid binary hierarchical construct such as the one described herein. The hierarchical model of the present disclosure may facilitate efficient, fast, and secure data distribution throughout the decentralized network.

In some instances, every node in the decentralized network system may have a copy of the network. Data quality may be maintained by massive database replication and computational trust. Centralized official copies may not exist. Transactions may broadcast to the network using software. Messages may be delivered on a best-effort basis. Nodes (such as mining nodes) may validate transactions and activities, add them to the block they are building, and may broadcast the completed block to other nodes according to the structures, methods, distribution mechanisms, and constructs described herein.

The database network system may comprise a mechanism to assign each node a hierarchical level in the hierarchical construct. The method may further comprise distributing data according to the constructed hierarchical model. The hierarchical level of each node may correspond to its level or position in the hierarchical model and/or in the network. The method may comprise measuring, calculating, and/or quantifying a trusted score for each node. The nodes in the network may be sorted, categorized, and/or ranked in a hierarchical model based on respective trusted scores associated with the nodes. The trusted score of the nodes may be calculated according to the methods described herein and may be accumulated over time. The trusted score of each node may determine its respective position in the hierarchical construct. Further, data may be distributed in the network according to the hierarchical construct in an efficient and secure method for data distribution and storage.

Assigning Trusted Scores

Provided herein is a method for constructing a database network system from a plurality of nodes for decentralized data distribution. The method may comprise using a plurality of tests to assay a computing power of each of the plurality of nodes. In some cases, assaying a computing power of each of the plurality of nodes may be performed substantially simultaneously. In some examples, each of the plurality of nodes may receive a different test of the plurality of tests. Beneficially, this prevents different nodes from colluding and leveraging the computing power of another node. The method may further comprise determining a test score for the each of the plurality of nodes based at least in part on the determined computing power. The method may further comprise determining a trusted score for the each of the plurality of nodes based on the test score. In some cases, the trusted score may be based at least in part on a sum of the test score and an accumulated trusted score for the each of the plurality of nodes, if any. For example, the trusted score for a node may be updated with each test that the node is assayed with. Beneficially, the trusted score may reflect an accumulated loyalty level of the node to the database network system and credit such node accordingly. The method may further comprise generating a hierarchical construct of the plurality of nodes based on the respective trusted scores of the plurality of nodes. A node of the plurality of nodes in the hierarchical construct may be configured to receive a data block from a parent node (at a higher hierarchical level in the construct than that of the node) and distribute that data block to at least two child nodes (at a lower hierarchical level in the construct than that of the node). The parent node may have a higher trusted score than the node and the node may have a higher trusted score than each of the at least two child nodes. In some cases, the at least two child nodes may be at the same lower hierarchical level relative to the node. In other cases, the at least two child nodes may be at different lower hierarchical levels relative to the node.

In some examples, the method may further comprise repeating the method (e.g., providing a test; determining a test score; determining a trusted score; generating a hierarchical construct). The plurality of tests may be calculated by the plurality of nodes. In some cases, two tests of the plurality of tests provided to the at least two child nodes may be calculated by the node. Further, the trusted score for the node may be based at least in part on a given test score for a child node of the at least two child nodes.

In some cases, the tests on each of the plurality of nodes may be performed substantially simultaneously. Substantially simultaneously may comprise at most about 10 seconds (s), at most about 9 s, at most about 8 s, at most about 7 s, at most about 6 s, at most about 5 s, at most about 4 s, at most about 3 s, at most about 2 s, at most about 1 s, at most about 0.9 s, at most about 0.8 s, at most about 0.7 s, at most about 0.6 s, at most about 0.5 s, at most about 0.4 s, at most about 0.3 s, at most about 0.2, or less. In some cases, the tests on each of the plurality of nodes may be performed in real-time.

The plurality of tests may comprise calculation of a total block hash based on random block numbers. The method may further comprise distributing the data block from the parent node to the node, and from the node to the at least two child nodes. The method may further comprise validating the data block, by the each of the plurality of nodes, based on one or more trusted scores of one or more nodes in an upstream distribution path of the data block The database network system and/or the hierarchical construct may function based on the trusted score assigned to each node of the plurality of nodes. In some cases, in order for blocks to be added to the database network system and/or in order for nodes to enter the database network system or remain in the database network system or get promoted to a higher hierarchical level in the database network system, a scoring system may be involved. In some cases, game theory may be involved. For example, the nodes in the network may compete with another node to find a value which may be produced from the hash function. The value may be referred to as nonce, score, trusted score, trust score, and/or incentive. The trusted scores may be collected and accumulated over time.

Each node of the plurality of the nodes in the network and/or system may be assigned a trusted score. The trusted score of each note may in whole or in part correspond to its level in the hierarchical construct. In some cases, trusted scores may be calculated based on computation powers of the nodes. In some cases, tests may be designed to measure the computation powers of the nodes. In some cases, test scores may be accumulated during the lifetime of the node in the database network system. In some cases, the duration of time a given node has spent in the network may directly or indirectly correspond to its trusted score and hierarchical level. The longer a node stays in the network the more incentives it may collect, and its hierarchical level in the hierarchical construct/model may increase. The higher the trusted score, the higher the level of the node in the hierarchical construct. For example, the top node may have the highest trusted score among all the nodes in the database network system.

FIG. 1 illustrates an example hierarchical construct for decentralized data distribution. Data blocks may be distributed throughout the network. The database network system provided herein may comprise a plurality of nodes communicating in a hierarchical construct. In some cases, the hierarchical construct may comprise a pyramidal binary hierarchical construct, such as the pyramidal hierarchical construct illustrated in FIG. 1. A node 120 of the plurality of nodes in the hierarchical construct may be configured to receive a data block from a parent node 110 and distribute the data block to at least two child nodes (also referred to as sub-nodes) 130 and 140. In some cases, A node of the plurality of nodes in the hierarchical construct may be configured to receive a data block from a parent node and distribute the data block to two child nodes. A parent node may have a higher trusted score and a higher level in the hierarchical structure (e.g., pyramidal construct) compared to a child node. The parent node 110 may have a higher trusted score than the node. The node 120 may have a higher trusted score than each of the at least two child nodes 130 and 140.

In some cases, the node may be configured to distribute the data block to at most two child nodes. In some cases, a given node (such as a node server) in the construct may only have to transfer its data to two other nodes (e.g., corresponding child nodes or sub-nodes). This may increase data transmission speed (e.g., transaction speed) as compared to a scenario where each node would have to transfer its data to more than two nodes, such as to many more nodes, such as randomly, such as in a non-hierarchical manner, or non-pyramidal manner. In addition, this may have the benefit of decreasing the overhead for the trusted decentralized network. In some cases, data transmission speed, such as transaction speed reached by leveraging the methods and systems of the present disclosure, such as distributing data according to the hierarchical construct described herein may approach that of a centralized system, reach that of a centralized system, or be substantially similar to that of a centralized system, while also providing the benefits of a decentralized database network system. Otherwise, transaction speeds of an example centralized system may in many cases be higher, substantially higher, or significantly higher than an example decentralized network system not comprising a hierarchical construct such as the one described herein. The high speed and efficiency of data distribution which may in some cases be substantially similar to that of an example centralized network may benefit the scalability and real-world applicability of the database network system provided herein. In some cases, the node may be configured to distribute the data block to more than two child nodes. In some cases, the node may be configured to distribute the data block to at most about 100 nodes, 90 nodes, 80 nodes, 70 nodes, 60 nodes, 50 nodes, 40 nodes, 30 nodes, 20 nodes, 10 nodes, 9 nodes, 8 nodes, 7 nodes, 6 nodes, 5 nodes, 4 nodes, 3 nodes, or fewer. Alternatively or in addition, the node may be configured to distribute the data block to at least about 1 node, 2 nodes, 3 nodes, 4 nodes, 5 nodes, 6 nodes, 7 nodes, 8 nodes, 9 nodes, 10 nodes, 20 nodes, 30 nodes, 40 nodes, 50 nodes, 60 nodes, 70 nodes, 80 nodes, 90 nodes, 100 nodes or greater. The number of child nodes that each node is configured to distribute to in the hierarchical model (e.g., pyramidal construct) may be optimized.

In some cases, data distribution through the network of the nodes may progress exponentially. As data moves further down the hierarchical construct, more nodes may become involved in data distribution (e.g., from 1 to 2 to 4 to 8 to 16 to 32 and so on). More nodes may be activated to transfer and validate data and/or data blocks. The further an example data block goes downstream in a hierarchical construct, it may reach higher transfer and validation speeds, and the workload of data distribution may rapidly increase. In some cases, the rapid increase may be exponential. The hierarchical construct described herein may propagate the workload. In some cases, the workload may be propagated exponentially. In some cases, the hierarchical construct may provide other benefits, such as enhanced trust and value, resistance against attacks, governance of reward and penalty, value trust, secure block validation, and more benefits described herein.

In some examples, the speed, capacity, and/or efficiency of the hierarchical network may be estimated or evaluated based on the speed, capacity, and efficiency of one of its nodes. The capacity of a given node may vary. In some cases, if the transmission bandwidth is good, the overhead may decrease, substantially decrease, or be minimized. In an example scenario where the capacity of every node in the construct is equal to or substantially equal to that of the top node, any delay and/or congestion in the data distribution throughout the decentralized network can be prevented.

A node may be configured to validate the data block based on one or more trusted scores of one or more nodes in an upstream distribution path of the data block, such as a path defined by the hierarchical construct described herein. A distribution path may comprise the transfer and/or distribution of data from nodes at a higher level to nodes at lower levels, for example according to the hierarchical construct, such as a pyramid binary construct. Data may start distributing from the top node which may be for example at the top of the pyramidal construct and transfer to the other nodes further down the construct. In some cases, each of the plurality of nodes may comprise a copy of the hierarchical construct. The activities in the network, such as the transactions in the network may be referred to and/or propagated to the top node, and thereby be verified. A block of data may be populated and distributed throughout the network. For example, a given node may receive an example data block. It may verify the trusted scores of its preceding nodes in the distribution path, in some cases, all the way back to the top node server. This may confirm the distribution path and/or the origin of the data distribution block.

In some cases, validation may further comprise a random confirmation of the data. This may help avoid compromised data and origin of the data distribution block. Random confirmation of data for an example distribution block may be performed based on the hash of an upper node, such as a node at a higher hierarchical level compared to the nodes of the block. As such, random block validation may involve a small data size overhead, while it may add an extra proof and/or seal of the distribution path and the origin of the distribution (e.g., transaction0 block.

In some cases, potential compromises of data blocks of a mid-node server and/or external alien server may be capable of being detected and rejected. Block validation throughout the distribution in the network may contribute to building a trusted network. In some cases, ensuring block validation throughout the distribution in the network may establish a trusted network.

The data block may comprise a cryptographic hash of a previous data block in a blockchain network. The blockchain network may comprise the previous data block and the current data block. The node may be configured to further validate the data block based on the cryptographic hash. In some cases, each node may have a current copy of the hierarchical construct (e.g., pyramid structure). This may act as a seal for consensus for the data path and trust of the network.

In an example scenario where a sub-node would be offline or inactive, for example by congestion, its sub-nodes, such as nodes that are in a lower hierarchical level in the construct compared to the mentioned congested node may be chosen to continue the distribution of data and its path. Distribution may continue in the network, bypassing the congested node. In case the congested node re-activates, for example becomes online after being offline for a while, it may update its missed blocks and rejoin and participate in data distribution in the network.

The distribution or flow of data in the network can be maintained and/or preserved by various security measures. An attack on an intermediate node (a node other than the top node) may not disrupt data distribution in the network. In case the top node in the hierarchical construct or an example data block is attacked, one of its child nodes, or sub-nodes, such as a node that is one level lower than that top node in the hierarchical construct may take over and be allocated as the top node in the construct. A second attack on the allocated node may prompt allocation of the next node in line (such as a child node, a sub-node, or a node which is one level lower in the hierarchy) as the next top node, and so on. In some cases, the hierarchical construct such as the pyramidal construct may be secured against outside attacks. In some cases, it may be immune to attacks until the last node in the network.

Each node of plurality of nodes in the network may comprise a copy of the hierarchical construct. This may in some cases function as a passthrough seal to prevent potential data breach or the entrance of alien attacks or attacked data into the network. The origin of the external alien server or the source of the attack data may be identified, in some cases at least at part by comparing such source with the copy of the hierarchical construct carried through by an example node in the network, a plurality of nodes in the network, or all the nodes in the network. An attack-resistance defense mechanism can be constructed without using a proof-of-work consensus method. In some cases, the security procedures and/or attack resistance defense mechanism described herein may be more secure than a proof-of-work procedure. In addition, a proof-of-work mechanism may require using significant or substantial computer power over time, or almost all the time. The method described herein may not use a proof-of-work mechanism and may be more secure and at the same time consume less computer power over time.

The hierarchical construct, such as a pyramidal construct may be generated or constructed according to trusted scores the nodes accumulate. Each node may be tested and assigned a trusted score. Nodes may be tested fairly. For example, each node's computing power may be measured and tested. In some cases, the time period for testing each node's computing power may be relatively short (for example relative to that used in a proof-of-work mechanism). This may preserve computer power and capacity to be potentially or optionally spent to execute the networks intended functional application rather than spending most of its power and capacity to calculate the computing power of the nodes, as the case may be in a proof-of-work mechanism. To accomplish this, in some cases, the test may be given to all the nodes simultaneously, substantially simultaneously, at about the same time, within a short time interval, within a minimal time interval, or within a time interval asymptotically approaching zero, in real-time, or in substantially real-time. In some cases, the test for each node in the network may be accurately performed at such time intervals.

In an example, the hierarchical construct may facilitate data distribution to about 1.3 million nodes in less than about 0.4 seconds (s). The hierarchical construct may facilitate data distribution to about 1 million nodes in less than about 1 s, 0.9 s, 0.8 s, 0.7 s, 0.6 s, 0.5 s, 0.4 s, 0.3 s, 0.3 s, or less. In the same example, the latency between the nodes may be 20 milliseconds (ms), and the bandwidth speed may be 1 mbs. In the same example, the latency between the nodes may be at most about 100 milliseconds (ms), 90 ms, 80 ms, 70 ms, 60 ms, 50 ms, 40 ms, 30 ms, 20 ms, 15 ms, 10 ms, or less. The bandwidth speed may be 1 mbs. In some examples, the bandwidth speed may be at most about 0.5 mbs, 0.6 mbs, 0.7 mbs, 0.9 mbs, 1 mbs, 1.5 mbs, 2 mbs, 2.5 mbs, 3 mbs, 3.5 mbs, or more. In some examples, the bandwidth speed may be at least about 0.5 mbs, 0.6 mbs, 0.7 mbs, 0.9 mbs, 1 mbs, 1.5 mbs, 2 mbs, 2.5 mbs, 3 mbs, 3.5 mbs, or more. In some cases, a tree-exponential distribution may be performed. This may enable the testing of each node's computation power to be accurately performed simultaneously, substantially simultaneously, at about the same time, within a short time interval, within a minimal time interval, or within a time interval asymptotically approaching zero, in real-time, or in substantially real-time.

In some cases, unique tests are given to individual nodes in the system to avoid a scenario where a given node can calculate the answer to the test and distribute it to other nodes. In some cases, the top node may be given two different tests for its two corresponding sub-nodes or child nodes in the pyramidal construct. Each of those sub-nodes may be given two different tests for their own two corresponding sub-nodes in the pyramidal construct. A similar trend may continue throughout the network.

Each node at a higher hierarchical level network may be given two different tests for its two corresponding sub-nodes in the pyramidal construct. This way, by distributing the tasks of calculating the test throughout the network, each node may receive a different test without extra overhead or any overhead. The difficulty level of the tests given to individual nodes in the network may be similar, substantially similar, or the same for all the nodes. Alternatively, the difficulty levels may slightly vary, or be somewhat different. Each node (e.g., sever node) may transmit, deliver, or send the tests to its corresponding sub-nodes in the pyramidal construct and measure the time it takes for the test results to come back from those nodes. The server node may then use the measured time to calculate each of those nodes' computation power. For example, a test may be to calculate the total block hash for a random number of data blocks. Each node may receive a test to calculate the total block hash for a unique (different from the tests other nodes received) random number of blocks. Generating random numbers of blocks or a range of random numbers of blocks may be fast and/or computationally inexpensive. Calculating the total hash of the block may be easily achieved, light, and computationally inexpensive, while it can accomplish the task of measuring the nodes' computation power. In some cases, it may confirm that the test was taken, and full computing power of the node may be efficiently measured and/or calculated.

In some cases, incentives may be given to the nodes of the network. An incentive may be given to an example node at least partly based on the test results of its corresponding sub-nodes, such as the nodes that are at a lower hierarchical level compared to that node. Tests scores or test results may be calculated according to the methods described herein, such as a computation power test described herein. The position of each node in the network, such as its hierarchical level in the network (e.g., in the hierarchical construct) can be altered based on the incentive(s) it is given and/or it has acquired.

For example, nodes may move up and/or down in the network based on the incentives they are given according to the test scores of their corresponding sub-nodes. For example, the nodes that are at a lower hierarchical level compared to an example node may contribute to the incentives of the node at the higher hierarchical level. In some cases, a top node may neither advantage nor disadvantage the incentives and/or test scores of its sub-nodes. A node that may be considered as a top node compared to a plurality of sub-nodes may not advantage the incentives and test scores of its sub-nodes because that may compromise its own position as the top node (such as its higher hierarchical level) in the network. For example, in an example scenario if a top node advantages the incentive and/or test scores of its sub-nodes, such sub-nodes may move up and compete with the top node for its position. Likewise, a node that may be considered as a top node compared to a plurality of sub-nodes may not disadvantage the incentives and/or test scores of its sub-nodes because that may be unfavorable for its own incentive. This mechanism may help facilitate the distribution of the computation power tests throughout the network. In some cases, the distribution may be even, fair, unbiased, and/or substantially unbiased. In some examples, this mechanism may contribute to stabilizing the network.

Each node in the network may carry a score and/or a score weight of value on which the hierarchical construct, such as a hierarchical pyramidal construct, or a pyramid-chain may be built. The incentive structure may prevent and/or discourage the nodes from leaving the network. This may encourage adoption viability and/or the addition of more nodes to the network. As the scores of the nodes accumulate during their lifetime, a long-term credibility may be established in the network. The value of the network may be based on the real computing power of the network and/or the nodes of the network, and or both. In some cases, the network may be used as a medium of exchange of value, such as for transactions. In some cases, the network may comprise a credible medium of exchange of value, the credibility of which may be based on its real computation power which may be accumulated in each of its nodes during their lifetime in the network.

The position of each node in the network (such as its level in the hierarchical construct) may be determined at least in part, based on its computation power. A computation power of a node may be measured and/or calculated by giving it a computation power test, such as the tests described herein. The test scores may directly and/or indirectly correspond to the computation power of the node. The computation power of the node may directly and/or indirectly, in whole or in part, determine its position in the hierarchical construct. In some cases, a computation power of a node may be secure and/or substantially secure against manipulation by other factors such as external factors. Therefore, in some cases, the computation power of an example node may not be easily manipulated. In some cases, a computation power of an example node may be completely secure against manipulation.

In some cases, an unknown reason or a plurality of unknown reasons and/or factors may affect the position of an example node in the network to either promote or demote it. For example, an unknown factor may cause a node to move to a higher or lower hierarchical level in the construct. In an example, the transfer of a score value may change the position of an example node in the network.

In some cases, movement (such as a change in the hierarchical position) of example nodes in the network may not be independent of the movement of other nodes in the network. In some cases, movement (such as a change in the hierarchical position) of example nodes in the network may depend of the movement of other nodes in the network. In some cases, a change in a position of an example node (e.g., a movement of a node in the network) may depend on or be affected by a change in the position of one or more other nodes in the network. For example, in some cases, the movement of one node in the network may affect the position of one or more nodes in the network by causing them to promote (move to a higher hierarchical level) or demote (move to a lower hierarchical level). For example, one node may promote to a higher level causing one or more other nodes to move to lower hierarchical level(s). In some cases, the nodes in the network may compete for higher positions. Competition may be at least in part based on the nodes' computation power. In some cases, additional factors may be involved in the competition as well. In some cases, competition of the nodes for higher positions may be based on their computation powers and the time each node has spent in the network. Nodes which have spent more time in the network may build loyalty and be incentivized compared to nodes that have similar computation powers but have spent shorter times in the network.

In some examples, whether or not a given node may be promoted to a higher level in the network may cost another node a portion of its value score. For example, at least part of an example node's value score may be transferred to another node, thereby promoting that other node. This mechanism may comprise or be a voting mechanism. The transfer of score value from one node to another may be considered an important event. One reason may be that the value score for each node may have been accumulated during its lifetime in the network, at least in part based on its computation power (e.g., based on its performance in computation power tests given to it during its lifetime in the network). The value score of a node may have been accumulated over the long-term. Therefore, the transfer of a value score from one node to another node and thereby promoting and/or demoting such node(s) may be considered an important event. This mechanism may comprise a price tag for network governance. It may contribute to creating a stable network. In some cases, it may ensure creating a stable network. For example, the transfer of computation score from a given node to another, and the inter-dependent movement of the network nodes in the hierarchical construct may help generate a stable network. In some cases, an upper rogue node may exist in the network. In some cases, a stable network may be generated even in the case of an upper rogue node. An upper rogue node may be a node (such as a user node) that may be in a higher hierarchical level in the hierarchical construct compared to a plurality of nodes, which may remain connected to the database network system, yet may not have permission to access and operate in the database network system. In the methods and systems provided herein, in some cases, the existence of such nodes may not interrupt the stability of the database network system.

Application Interfaces

Provided herein are blockchain-integrated interfaces. A blockchain-integrated interface may provide a decentralized application. A decentralized application may comprise or facilitate extending or appending an activity, such as a transaction, in a block. A decentralized application may comprise using the extended activity, such as the extended transaction to identify and/or reference information regarding internal and/or external data associations. Various types of applications may be developed in the database network system. In some examples, provided herein are applications, platforms, and interfaces.

In some examples, provided herein is a platform, such as an application, such as an interface, for storing, managing, maintaining, transferring and/or using documents. The platform may be a document platform. The platform, application, and/or interface may be referred to as the document engine. In some cases, the platform, application, and/or interface may be given other names. The platform or applications may be used to handle, store, manage, or distribute documents.

The document platform may be an application of a database network system for data distribution, such as blockchain network. In some cases, the document platform may operate according to the structures and the mechanisms of the hierarchical construct and/or the database network system and mechanisms (e.g., the blockchain network system) described herein. Alternatively, the method of operation of the document platform (e.g., the document engine) may be different from the structures and the methods described for the database network system.

The documents may be any type of documents. In some cases, the documents may comprise or be transaction documents. In some cases, the documents may comprise or be legal documents. In some examples, the documents may be recorded as evidence, record, or proof for a transaction and/or a transfer of a value. Value may be any type of value, such as an asset or property. In some cases, the documents may be documents relevant to the transactions performed using the database network system provided herein. In some cases, the documents may comprise other source(s) of information. In some examples, the documents may comprise records regarding transactions performed using databases, networks, or media other than the network provided herein. In some cases, the documents may have multiple sources, such as 1 source, 2 sources, 3 sources, 4 sources, 5 sources, or more sources. A combination of sources may provide information to the platform (e.g., the document engine).

Provided are also the methods of operation and the methods of use of the document platform. In some examples, a plurality of documents may be combined in one or more files. Each file may have a predetermined size. In some cases, a plurality of documents may be combined in a single file. The file may have a predetermined size. The one or more files, such as a single file comprising the documents may be distributed in a database network, such as a blockchain network, such as the database network system described herein. In some cases, the one or more files comprising the documents may be distributed throughout the network along with additional data and/or additional data blocks. The additional data may be relevant to the content of the documents. Alternatively, the additional data may not be relevant to the content of the documents. The additional data may have any content and/or any source. The one or more files may be distributed in whole or in part throughout part of the network or the entire network for any reason.

As an example, the documents may be transaction documents. In some cases, the one or more files comprising the documents may be distributed throughout the network along with transaction data and/or transaction data blocks. In another example, documents may be legal documents, or documents recording a transfer of an object of value, such as a property, asset, or other. The additional data may comprise any data which in some cases may be relevant to the documents.

In some cases, the documents and/or the one or more files may form an integrated unit along with the additional data which may be distributed with them. For example, the documents and/or document files (such as the one or more files comprising the documents) may form an integrated unit along with the additional data and be distributed throughout the network. In an example, one or more transaction data blocks may form an integrated unit with one or more files comprising transaction documents. In some cases, the integrated unit may be used for distributing and/or updating the documents, the additional data, and/or both. In some examples, the documents and a transaction block may form an integrated unit for distribution and updating information in the documents, the other data, and/or both. For example, the documents, the one or more files comprising the documents, and/or other data may be distributed to a new node which may join the network. In some cases, a node may turn offline, and turn back online after a certain time. The documents, the one or more files comprising the documents, and/or other data may be distributed to or updated in a node which may had been turned offline and may have turned back online after a set period of time.

In some cases, a document may comprise an extension of a data line in the block. For instance, a transaction may take place. Data regarding the transaction may be generated. A document may comprise information regarding the event, such as a transaction or other event. For example, a document may be a transaction document. A transaction document may comprise an extension of a transaction line in the block.

The documents may comprise transaction documents, legal documents, invoice documents, media, picture, video, sound, or other types of media, games, or other types of data, documents and/or contents of documents of any format, type, and/or size. The documents may have any length. The document platform may comprise or be capable of facilitating diverse types of applications. Such applications may comprise interaction applications. In some cases, interaction applications may have relatively small sizes or involve relatively small document sizes and/or lengths, such as small lines compared to other applications. Applications may comprise invoice document applications. In some cases, invoice document applications may comprise medium sizes and/or involve medium document sizes (relatively, compared to other applications and other document types). Applications may comprise media document applications. In some cases, media document applications may comprise relatively large sizes compared to other applications and/or other types of documents.

In some cases, transaction types may be part of an example extension line. Transaction types may identify an example transaction for a specific action at a specific time, such as the present time, or a set time in the future. For example, potential future applications may be added by allocating a new transaction type while other activities, such as transactions, are concurrently being performed at the present time. In some cases, potential future applications may be added by allocating a new transaction type without crowding and/or influencing the activities being performed at the present time.

In some cases, transaction lines may be mixed. Transaction lines may be mixed at the final stage of the block construct.

Applications with various functions may be developed to run in the database network system.

Blocks in the network system may hold batches of valid transactions that may be hashed and encoded into a structure. Each block may include a cryptographic hash of the prior block in the blockchain network, which may link them. In some cases, the blockchain network may be a trusted blockchain network.

Decentralized applications may comprise functions such as searching and/or performing search queries. Performing search queries in the database network system provided herein may have several advantages over performing them in other networks. For example, in some cases, new applications may be developed and/or added to the network provided herein without indexing and/or grouping example datasets in certain categories. Indexing may have the disadvantage of increasing the computational burden on the network and/or slowing down data distribution in the network. For example, in some cases, indexing and/or grouping datasets together may be data-heavy. In some cases, such indexing may need to be replicated throughout all the nodes in the network, which may make it even heavier. Linking the blocks in the database network system presented herein may increase the speed of data distribution throughout the network. Multiple applications may be added to the network. In some cases, the multiple applications may be added and/or run concurrently. In some cases, rapid data distribution may be performed while adding multiple applications. Multiple applications may comprise search queries. Search queries may be performed without indexing datasets. Not indexing dataset may increase the search speeds.

The database network system provided herein may comprise an application programing interface (API) and may be used for developer applications.

Various programming and/or scripting languages may be used to develop new applications in the database network system provided herein. Programming or scripting languages may comprise JavaScript (JS), NodeJS, C, C++, C #, Objective-C, VBScript, PHP (Hypertext Processor), Perl, Python, Ruby, Ruby on Rails, ASp, Tcl, HTML (HyperText Markup Language), Java, SQL (Structured Query Language), Swift, and other programming languages.

Programming and/or scripting languages may comprise A #.NET, A-0 System, A+, A++, ABAP, ABC, ABC ALGOL, ACC, ACCENT, ACE DASL (Distributed Application Specification Language), Action!, ActionScript, Actor, Ada, Adenine, Agda, Agilent VEE, Agora, AIMMS, Aldor, Alef, ALf, ALGOL 58, ALGOL 60, ALGOL 68, ALGOL W, Alice, Alma-0, AmbientTalk, Amiga E, AMOS, AMPL, AngelScript, Apex, APL, App Inventor for Android's visual block language, AppleScript, APT, Arc, ARexx, Argus, Assembly language, AutoHotkey, AutoLISP/Visual LISP, Averest, AWK, Axum, Active Server Pages, B, Babbage, Ballerina, Bash, BASIC, bc, BCPL, BeanShell, Batch file (Windows/MS-DOS), Bertrand, BETA, BLISS, Blockly, BlooP, Boo, Boomerang, Bourne shell (including bash and ksh), C, C--, C++, C*, C #, C/AL, Cache ObjectScript, C shell, Caml, Cayenne, Cduce, Cecil, Cesil, Céu, Ceylon, CFEngine, Cg, Ch, Chapel, Charity, Charm, CHILL, CHIP-8, chomski, ChucK, Cilk, Citrine, CL (IBM), Claire, Clarion, Clean, Clipper, CLIPS, CLIST, Clojure, CLU, CMS-2, COBOL, CobolScript, Cobra, CoffeeScript, ColdFusion, COMAL, Combined Programming Language (CPL), COMIT, Common Intermediate Language (CM), Common Lisp (Cl), COMPASS, Component Pascal, Constraint Handling Rules (CHR), COMTRAN, Cool, Coq, Coral 66, CorVision, COWSEL, CPL, Cryptol, Crystal, Csound, CSP, Cuneiform, Curl, Curry, Cybil, Cyclone, Cython.

Programming and/or scripting languages may comprise D, Datapoint's Advanced Systems Language (DASL), Dart, Darwin, DataFlex, Datalog, DATARIEVE, dBase, dc, DCL, DinkC, DIBOL, Dog, Draco, DRAKON, Dylan, DYNAMO, DAX (Data Analysis Expressions), E, Ease, Easy OL/I, EASYTRIEVE PLUS, eC, ECMAScript, Edinburgh IMP, EGL, Eiffel, ELAN, Elixir, Elm, Emacs Lisp, Emerald, Epigram, EPL (Easy Programming Language), EPL (Eltron Programming Language), Erlang, es, Escher, ESPOL, Esterel, Etoys, Euclid, Euler, Euphoria, EuLisp Robot Programming Language, CMS EXEC (EXEC), EXEC 2, Executable UML, Ezhil, F, F #, F*, Factor, Fantom, FAUST, FFP, Fjölnir, FL, Flavors, Flex, FlooP, FLOW-MATIC, FOCAL, FOCUS, FOIL, FORMAC, @Formula, Forth, Fortran, Fortress, FP, FRanz Lisp, and F-Script.

Programming and/or scripting languages may comprise Game Maker Language, GameMonkey Script, GAMS, GAP, G-code, GDScript, Genie, GDL, GEORGE, GLSL, GNU E, Go, Go!, GOAL, Gödel, Golo, GOM (Good Old Mad), Google Apps Script, Gosu, GOTRAN, GPSS, GraphTalk, GRASS, Grasshopper, Groovy, Hack, HAGGIS, HAL/S, Halide (programming language), Gamilton C Shell, Harbour, Hartmann pipelines, Haskell, Haxe, Hermes, High Level Assembly, HLSL, Hollywood, HolyC, Hop, Hopscotch, Hope, Hugo, Hume, HyperTalk, Io, Icon, IBM Basic assembly language, IBM HAScript, IBM Informix-4GL, IBM RPG, Irineu, IDL, Idris, and Inform.

Programming and/or scripting languages may comprise J, J #, J++, JADE, JAL, Janus (concurrent constraint programming language), Janus (time-reversible computing programming language), JASS, Java, JavaFX Script, JCL, JEAN, Join Java, JOSS, Joule, JOVIAL, Joy, JScript, JScript.NET, Julia, Jython, K, Kaleidoscope, Karel, KEE, Kixtart, Klerer-May System, KIF, Kojo, Kotlin, KRC, KRL, KRL (KUKA Robot Language), KRYPTON, Korn shell (ksh), Kodu, and Kv.

Programming and/or scripting languages may comprise LABVIEW, Ladder, LANSA, Lasso, Lava, LC-3, Legoscript, LIL, LilyPond, Limbo, Limnor, LINC, Lingo, LINQ, LIS, LISA, Lisp, Lite-C, Lithe, Little b, LLL, Logo, Logtalk, LotusScript, LPC, LSE, LSL, LiveCode, LiveScript, Lua, Lucid, Lustre, LYaPAS, Lynx, M2001, M4, M #, Machine code, MAD (Michigan Algorithm Decoder), MAD/I, Magik, Magma, Maude system, Mani, Maple, MAPPER, BIS, MAPPER (part of BIS), MDL, Mercury, Mesa, Metafont, MHEG-5 (Interactive TV programming language) Microcode, MicroScript, MIIS, Milk (programming language), MIMIC, Mirah, Miranda, MIVA Script, ML, Model 204, Modelica, Modula, Modula-2, Modula-3, Mohol, MOO, Mortran, Mouse, MPD, Mathcad, MSL, MUMPS, MuPAD, Mutan, and Mystic Programming Language (MPL).

Programming and/or scripting languages may comprise NASM, Napier88, Neko, Nemerle, NESL, Net.Data, NetLogo, NetRexx, NewLISP, NEWP, Newspeak, NewtonScript, Next Generation Shell, Nial, Nice, Nickle (NIITIN), Nim, NPL, Not eXactly C (NXC), Not Quite C (NQC), NSIS, Nu, NWScript, NXT-G, o:XML, Oak, Oberon, OBJ2, Object Lisp, ObjectLOGO, Object REXX, Object Pascal, Objective-C, Objective-J, Obliq, OCaml, occam, occam-π, Octave, OmniMark, Onyx, Opa, Opal, OpenCL, OpenEdge ABL, OPL, OpenVera, OPS5, OptimJ, Orc, ORCA/Modula-2, Oriel, Orwell, Oxygene, Oz, P, P4, P", ParaSail (programming language), PARI/GP, Pascal, PCASTL, PCF, PEARL, Perl, PDL, Pharo, PHP, Pico, Picolisp, Pict, Pig (programming tool), Pike, PILOT, Pipelines, Pinecone, Pizza, PL-11, PL/0, PUB, PL/I, PL/M, PL/P, PL/SQL, PL360, PLANC, Plankalla, Planner, PLEX, PLEXIL, Plus, Pony, POP-11, POP-2, PostScript, PortablE, POV-Ray SDL, Powerhouse, PowerBuilder, PowerBuilder (4GL GUI application generator from Sybase), PowerShell, PPL, Processing, Processing.js, Prograph, PROIV, Prolog, PROMAL, Promela, POROSE modeling language, PROTEL, ProvideX, Pro*C, Pure, Pure Data, PureScript, and Python.

Programming and/or scripting languages may comprise Q (programming language from Kx Systems), Q # (Microsoft programming language), Qalb, QtScript, QuakeC, QPL, Qbasic, R, R++, Racket, Raku, RAPID, Rapira, Ratfiv, Ratfor, rc, Reason, REBOL, Red, Redcode, REFAL, REXX, Rlab, ROOP, RPG, RPL, RSL, RTL/2, Ruby, RuneScript, Rust, S, S2, S3, S-Lang, S-PLUS, SA-C, SabreTalk, SAIL, SAM76, SAS, SASL, Sather, Sawzall, Scala Scheme, Scilab, Scratch, Script.NET, Sed, Seed7, Self, SenseTalk, SequenceL, Serpent, SETL, SIMPOL, SIGNAL, SiMPLE, SIMSCRIPT, Simula, Simulink, Singularity, SISAL, SLIP, SMALL, Smalltalk, SML, Strongtalk, Snap!, SNOBOL (SPITBOL), Snowball, SOL, Solidity, SOPHAEROS, SPARK, Speakeasy, Speedcode, SPIN, SP/k, SPS, SQL, SQR, Squeak, Squirrel, SR, S/SL, Starlogo, Strand, Stata, Stateflow, Subtext, SBL, SuperCollider, SuperTalk, Swift (Apple programming language), Swift (parallel scripting language), SYMPL, and SystemVerilog.

Programming and/or scripting languages may comprise T, TACL, TACPOL, TADS, TAL, Tcl, Tea, TECO, TELCOMP, TeX, TEX, TIE, TMG (compiler-compiler), Tom, TOM, Toi, Topspeed, TPU, Trac, TTM, T-SQL, Transcript, TTCN, Turing, TUTOR, TXL, TypeScript, Tynker, Ubercode, UCSD Pascal, Umple, Unicorn, Uniface, UNITY, Unix shell, UnrealScript, V, Vala, Verilog, VHDL, Vim script, Viper, Visual Basic, Visual Basic. NET, Visual DataFlex, Visual DialogScript, Visual Fortran, Visual FoxPro, Visual J++, Visual LISP, Visual Objects, Visual Prolo, VSXu, WATFIV, WATFOR, WebAssembly, WebDNA, Whiley, Winbatch, Wolfram Language, Wyvern, X++, X10, xBase, xBase++, XBL, XC (targets XMOS architecture), xHarbour, XL, Xojo, XOTcl, XOD (programming language), XPath, XPL, XPL0, XQuery, XSB, XSharp, XSLT, Xtend, Yorick, YQL, Yoix, YUI, Z notation, Zebra, ZPL, ZPL2, Zeno, ZetaLisp, ZOPL, Zsh, ZPL, Z++, and more.

In some cases, one or more programming and/or scripting languages may be used to develop an application in the database network system. In some cases, a combination of different programming and/or scripting languages may be used. In some examples, NodeJS may be used as the base framework of every node in the network. In some cases, the root network and relevant protocols (in whole or in part) may be done in C/C++. In some examples, JavaScript may be used to develop and/or produce applications. Other combinations of programming and/or scripting languages may be used as the base framework of the nodes in the network (in whole or in part). The root network and relevant protocols may be done in any programming language or combinations thereof.

Security Mechanisms for Dynamic Pyramid Construct

The present disclosure provides security mechanisms for dynamic, decentralized data distribution. A database network may comprise a plurality of nodes as described elsewhere herein. The plurality of nodes may communicate in a dynamic hierarchical construct. The dynamic hierarchical construct may comprise a top node. A node of the plurality of nodes in the dynamic hierarchical construct may be configured to receive a data block from a parent node and distribute that data block to at least two child nodes. The node may be configured to validate the data block based on an upstream distribution path of the data block to the top node. The dynamic hierarchical construct may be configured to change the top node with each data block. Each of the plurality of nodes may comprise a copy of the dynamic hierarchical construct.

The dynamic hierarchical construct may be based on a trusted score assigned to each node of the plurality of nodes. The parent node may have a higher trusted score than the node and the node may have a higher trusted score than each of the at least two child nodes. The node may be configured to validate the data block based on one or more trusted scores of one or more nodes in the upstream distribution path of the data block. For example, trusted score assignment mechanisms are described elsewhere herein.

Data may be distributed throughout the network according to a defined path. The distribution path may follow a hierarchical paradigm according to a hierarchical construct such as a pyramidal construct. In some cases, the hierarchical construct may comprise or be a dynamic hierarchical construct. The distribution path may be designed, adjusted, and optimized. Nodes may be assigned hierarchical levels according to test scores and/or additional factors. For example, a node which may have a higher (in some cases the highest) computation power compared to the other nodes in the network and which may have spent a relatively longer (in some cases the longest) time in the network may be determined to be the top node in the network. In some cases, the top node may also be the top miner.

In some cases, the position of the top node may be altered or changed according to a defined mechanism, algorithm and/or approach. For example, in some cases, the position of the top node may change after a set time interval among a few other nodes which are at a top percentile in the hierarchical construct. As an example, the position of the top node may change every 0.5 second (s) among the top 10% nodes. In other examples, the position of the top node may change every $\Delta s$ second among the top p % nodes, where $\Delta s$ may be from 0.01 s to 5 s, such as for example 0.01 s, 0.05 s, 0.1 s, 0.15 s, 0.2 s, 0.25 s, 0.3 s, 0.35 s, 0.4 s, 0.45 s, 0.5 s, 0.6 s, 0.7 s, 0.8 s, 0.9 s, 1 s, 2 s, 3 s, 5 s, or other time intervals, and p % may be for example, 1%, 2%, 3%, 4%, 5%, 6%, 7%, 8%, 9%, 10%, 11%, 12%, 13%, 14%, 15%, 16%, 17%, 18%, 19%, 20%, 25%, 30%, or other percentiles. In other examples, other time intervals and percentiles may be applied.

For a block of transactions, a new random binary tree may be generated which may determine or change the data distribution path in the network. This mechanism may make it more difficult for external entities to predict the path of data distribution and the position of the top node in the network. In some cases, the distribution path may be unpredictable. This mechanism may introduce an unpredictable distribution path and an unpredictable top node position every $\Delta s$ second for the next cycle.

In some cases, external attackers may be unsuccessful to predict the top node (e.g., the top miner) for the next cycle. An alternative strategy for the potential external attacker may be to try to find and attack all suspected top node positions, which may be too difficult and/or expensive. Therefore, randomly changing the position of the top node among a percentile of tope nodes at set time intervals may provide a security measure against external attacks.

Provided herein are methods for securing the database network system against external attacks and other security risks which may comprise computation power analysis of the nodes to determine top node positions, loyalty to network (giving incentives to nodes which have spent more time in the network), and quantum randomness (randomly changing the position of the top node among a percentile of tope nodes at set time intervals) according to the methods described herein. In some cases, data blocks may only be produced when activities such as transactions or other types of activities occur. Therefore, in some cases, empty blocks may not occur or exist and/or may not freeze the trading of coins. In some cases, double-spending problems may not be able to occur in the database network system described herein.

The data block may comprise a cryptographic hash of a previous data block in a blockchain network comprising the previous data block and the data block. The node may be configured to further validate the data block based on the cryptographic hash. The node may be configured to distribute the data block to at most two child nodes.

The data block may be signed by a user private key. The user private key may be configured for verification by a user public key. The user public key may be stored on a blockchain network. Each node of the plurality of nodes may be configured to verify the user private key using the user public key.

In some cases, the data block may be signed by an application private key. The application private key may be configured for verification by an application public key. The application public key may be stored on the blockchain network, and each node of the plurality of nodes may be configured to verify the application private key using the application public key.

The database network system may comprise a security mechanism or a plurality of security mechanisms to keep it secure against different forms of attacks. Provided herein are security mechanisms to avoid problems which may often be associated with decentralized networks. In some examples, the database network system presented herein may be more secure against different forms of attacks compared to other database network system, such as other decentralized networks, such as other blockchain networks.

Common problems associated with decentralized networks may comprise a risk of undesired centralization of the decentralized network. For example, in some cases, the computer resources which may be needed to process larger amounts of data may become more expensive. As more users may incur more transactions, it may take longer for verification. This may reduce re operational efficiency gradually in the network. Example attacks and/or problems against the database network system may comprise forking attacks, double-spending problems, and/or other problems. Provided herein may be methods for reducing such risks and problems. Provided herein may be a consensus method for decentralized data distribution which may be less vulnerable or substantially less vulnerable, or in some cases, not significantly vulnerable, or not vulnerable to a forking attach, such as a 51% forking attack and/or a double-spending problem.

Provided herein are security mechanisms to keep the database network system secure or substantially secure against attacks, risks and other types of problems. The database network system may comprise a consensus method. In some cases, the consensus method may comprise or be according to a hierarchical construct, such as a hierarchical construct described herein, such as a quantum binary hierarchical construct described herein, which may provide the benefit of making the database network system more secure against the common risks and problems associated with other decentralized networks. Such problems and risks may comprise 51% forking attacks, double-spending problems, and more.

For example, some decentralized networks, such as some proof-of-work blockchain networks may be vulnerable to forking attacks, such as 51% forking attack. In such networks, miners may need to voluntarily agree not to exceed the 51% hash rate threshold, in order to maintain the trust and value of the network. In some cases, bad actor nodes may exist, which may for example mine empty blocks and/or may freeze trading activities of other nodes of the network in whole or in part. In some cases, bad actor nodes may freeze all the trading activities of the other nodes in the network. In some cases, bad actor nodes in such networks may scheme a form of double spending by first presenting blocks and may later replace the presented blocks by empty blocks. In some instances, a bad actor node may gain control over the network in whole or in part, temporarily, for a short time, for a long time, or permanently. In some cases, the bad actor advantage or the control of the bad actor over the network may be short-lived. For example, the network's trust and value may break down and the network may get destroyed.

In some cases, the hierarchical construct consensus described herein (such as the quantum pyramid consensus of the network presented herein) may be less vulnerable to or substantially less vulnerable to 51% forking attack. In some cases, the hierarchical construct consensus described herein may not be vulnerable to 51% forking attack. In the hierarchical consensus presented herein, it may take time and loyalty for a node in the network to become the top node. The nodes in the network may compete to become the top node by collective incentives according to the methods described elsewhere herein, such as by taking computation power tests. In some cases, the ability of a node to get promoted to a higher hierarchical level, and eventually become the top node by replacing the current top nodes, may depend on both computation power and the duration of time the node has spent in the network. Therefore, in some cases, a node may need both a relatively high computation power and loyalty to the network (based on time spent in the network), in order to get promoted to a higher hierarchical level and eventually become the top node by replacing the current top node.

In some cases, a node's computation power as well as the time it has spent in the network may contribute to determining whether such example node may be promoted to a higher position in the hierarchical network. In an example, if a given node happens to have double the computing power of the current top node (or miner), and if the current top node has been in the top position for about 1 year, it may take that node 6 months to replace the top node. Therefore, an example node which has a high computation power, but which has not been in the network for a long time may not have built and/or demonstrated loyalty to the network and may not be capable of replacing an example top node with a similar or lower computation power which has been in the network for a long time. Therefore, both the computation power and the duration of time a node has spent in the network may be accounted for when a node is to be promoted to a higher hierarchical position in the network.

Provided herein are methods for keeping the database network system secure and in a functioning order even in case of a potential attack on the system. For example, an attack on the system may occur, yet data distribution in the network, and/or the activities and functions in the network, such as transactions, may not be hindered. Each node may have the network tree information. Therefore, in case of an attack, an example node which has the network tree information may direct the block of transaction to the next predetermined nodes. The network may keep functioning and distributing data, in some cases until the standing of the last node in the network.

The binary node-tree may provide clear decisions for the distribution of data in the network. For example, once a node becomes offline for any reason, other nodes may still be active and functioning, and the distribution of data blocks (e.g., transaction blocks in the network) may follow the next most effective path. The network may become more resilient by increasing the number of the nodes, as more nodes may be available to be used as back up for others and each node may have the complete information of the network. Therefore, the network may become more secured and resilient.

Encryption and Double-Signing

Provided herein are methods for protecting a database network system using encryption. Encryption may comprise encoding data, information, documents, messages, or other forms of data and information in such a way that only authorized parties may have access to it. Encryption may deny the intelligible content to an example potential interceptor. Encryption may comprise an algorithm, such as an encryption algorithm. In some cases, information or data may be obtained only by authorized parties. In some cases, data may be accessed only if decrypted such as by signing using a key, such as a user private key and/or a user public key. In some cases, the encryption scheme may comprise using an encryption key. An encryption key may be generated by an algorithm. The encryption key may be pseudo-random.

Encryption may comprise protecting the database network system provided herein or other networks using an encryption method which may comprise an encryption key and/or an algorithm. The method may comprise encrypting information regarding activities such as transactions taking place in the network, through the network, and/or using the network. The method may comprise encrypting, hiding and/or obscuring the value and/or importance, balance, spending, or any other information or data regarding a certain activity taking place in the network (such as a transaction taking place in or through the network).

The database network system may comprise security methods. Security methods may keep the database network system secure against attacks, such as external attacks. The database network system described herein may be protected by different measures and procedures.

Security methods may comprise the use of public key cryptography. Public key cryptography may comprise using a pair of a public key and a private key to perform different tasks. The pair of the public key and the private key may be referred to as keypair or a keypair signature. Public keys may be widely distributed, while private keys may be kept secret.

In some cases, security methods may further comprise encryption and double-signing using a user private key and a public key. In some cases, security methods may further comprise double-signing using an application private key and an application public key. Provided herein is an encryption scheme or method which may secure the system.

A public key (or signature) may be a random string of numbers. In some cases, the public key may be a long string of numbers which may seem or be random. A public key may be an address on the database network system. Value tokens may be sent across the network and may be recorded as belonging to that address. A private key (e.g., a user private key and/or an account password) (or signature) may function as a password that gives its owner (user) access to their user account, digital assets and/or otherwise authorize the user (owner of the account) to interact with the various capabilities that the network may support, such as the applications the network may support. For example, a first user may use a private key to digitally sign (or provide a digital signature on) any message or transaction. Another user (such as a second user) can take the public key, which in some cases anyone on the network may know, and the second user can use that to verify that the first user's private key was the one that actually signed that message/transaction. The second user may be able to verify that the first user was the real person who created that message or who made that transaction.

In some cases, data stored on the network may be incorruptible and/or substantially incorruptible. For example, using a user's public key, it may be possible to encrypt a message so that only an intended user with the relevant private key may decrypt it and thereby read it. Using a private key, a digital signature can be created so that anyone with the corresponding public key can verify that the message was created by the owner of the private key and may not have been modified since. Applications developed for the database network system and/or the blockchain database described herein may comprise an application private key and an application public key.

In some cases, signing with a private key and a public key alone may not be sufficient to secure the database network system and additional measures may also be applied. In some cases, the methods may further comprise using data encryption schemes provided herein as an additional security measure against data breach or other vulnerabilities. The encryption scheme provided herein may provide security against the risk of exposing information regarding the balance and the spending of an address account, or content of other transaction activity, to the public. Encryption may comprise obscuring the address of the account along with additional security measures and features.

The encryption method provided herein may comprise double-signing. Double-signing may provide an additional security measure to keep the network, the data blocks, and the applications safe and/or secure. Securing may comprise protecting against attack, hack, data breach, external manipulation, theft, or other types of attacks. In some cases, double-signing may comprise signing with a user private key, verifying the user private key, signing with an application private key, and verifying the application private key by the application public key.

In an example operation, the data block may be signed by a user private key. For example, a user may sign the data block using their private key. In some cases, the private key may be a password to a user account. In some cases, the user private key may be configured for verification by a user public key. The user public key may be stored on the network. Each node of the plurality of nodes on the network may have the public key or a copy of the public key of the user. Each node of the plurality of nodes may be configured to verify the user private key using the user public key. Such verification may contribute to securing the database network system. The data block may be signed by an application private key, and the application private key may be configured for verification by an application public key. The application public key may be stored on the database network system. Each node of the plurality of nodes may have a copy of the public key and may be configured to verify the application private key using the application public key. Such verification may comprise or be an additional security layer for the network, the data blocks, and the network applications and/or functions.

Alternatively, a data block may be signed by the user private key only. Alternatively, a data block may be signed by the application private key only.

For example, authorization of spending of an address account may require double-signing of the transaction. In some cases, the spending may only be authorized if the transaction is double-signed.

In an example operation, a user may sign a transaction using a user private key. The user private key may be verified by each node on the network using its public key. If the user private key is verified, the transaction may proceed to further verification (e.g., by the application public key). If the user private key cannot be verified by the nodes of the network using the public key, the transaction may not be authorized, and the transaction may not proceed. In further verification schemes, an application private key (e.g., a private key of a trusted application) may sign the same transaction. The application private key may be verified by each node on the network using the application public key (e.g., trusted application public key). Each node on the network may have a list of the public keys of the applications (e.g., trusted applications), and may use them to verify each application private key as needed. If the application private key is verified by the application public key, the transaction may be authorized, and the transaction may proceed. Alternatively, if the application private key cannot be verified by the application public key, the transaction may not be authorized and may not proceed. Where a transaction is not authorized, decryption may not be completed, and the user may not be authorized to perform the transaction.

In some cases, each trusted application may be like a contract, a program, or a major application. In some cases, trusted applications may be executed on local devices and not on each node in the network. This may further decentralize the computing power.

Provided herein are methods for authentication. In some cases, authentication may comprise authentication with the key (or signature) of the user (such as signing by a user private key and/or an account password), the signature of the application (such as signing by an application private key and/or an application public key and/or both), the signature of the top node (such as the private key of the top node), the signatures (keys and/or passcodes and/or passwords) of software updates, and the signatures of new addresses, and combinations thereof. Authentication may further comprise one or more verification steps, such as double-signing mechanisms, and more.

In some cases, each transaction of a user may be authenticated by their keypair signature (such as signing by private key and public key described herein), and then may be verified by each node in the decentralized network. The signature of a user's transaction (or another message a user may send or create) may comprise the private key of the keypair and the data of the transaction. Each node in the database network system may verify the signature by the public key of the keypair and the data of the transaction or the message sent or created. Each node may therefore verify a user's signature without knowing the user's private key. Therefore, in some cases, the verifying nodes may not be able to intrude on the ownership of the users and/or the intent of the transaction or the messages generated by that node. In some examples, no node can counterfeit the signature even though a transaction is public. Therefore, in some cases, any document, or title deed, or financial transaction can be authenticated by the user's signature without any risk of forgery.

Documents and financial transactions can also be encrypted to hide their importance and to be revealed only by the user's private key and that of the permissioned affiliates. A transaction that is authenticated by the user's signature can be coupled not only with an encrypted document information but also can optionally be coupled with a database action. The database action may be a part of the signature data verification. A database of an address that references its transactions on the blockchain may open multiple applications to retrieve selective information and associations of that public address. That database action may also be authenticated by the user's signature.

Other functionalities can optionally be activated or executed on each node in the similar way as that of a database action. Transaction authentication may protect the ownership in in multiple transaction type use cases and may form a primary pillar of security on the blockchain setup, such as the database network system described herein, the blockchain database, and/or both.

In some examples, authentication mechanisms may be implemented in the applications. For example, the signature of an application can be verified by each node in the database network system and can establish trust for an application. An example application can be tested by the users over time to establish reliability and trust over time. A trusted application may generate a signature from the application's private key, and the transaction data can be distributed.

In some cases, one or more users or, in some cases, many users can execute the trusted application that may be verified in the consensus of the nodes of the network. The application can hide its private key through calculations in its binary code. By putting the application in certain operating system environments, the application's private key can be further secured.

In some examples, the security mechanism may further comprise an additional measure to further hide the application private key. For example, the public key on each node used for authentication through the previous private key signature can be dynamically and/or periodically changed. For example the public key on each node used for authentication through the previous private key signature can be changed every Δ seconds, such as every 0.01 s, 0.05 s, 0.1 s, 0.15 s, 0.2 s, 0.25 s, 0.3 s, 0.35 s, 0.4 s, 0.45 s, 0.5 s, 0.6 s, 0.7 s, 0.8 s, 0.9 s, 1 s, 2 s, 3 s, 5 s, or other time intervals. In some cases, this may also invalidate outdated applications. So, a transaction double-signed by the application signature and the user signature may be authenticated for the user's and the application's ownership for a transaction.

The authentication of the user's signature for information and database actions and the signature of an application may facilitate secure, inter-application data exchanges. Without user intervention, applications may be able to authorize structured data exchanges from other applications.

The document platform (e.g., the document engine) and the blockchain database may provide a base for complex structured data generation that can be exchanged between applications and/or software. Use cases can comprise protocols for structured data exchange in the medical health care industry. For example, hospitals and other healthcare provider organizations may have different computer systems used for everything from billing records to patient tracking. In some cases, these systems can communicate with each other (or "interface") when they receive new information, or when they wish to retrieve information. The database network system, the blockchain database, and/or the document platform (e.g., document engine) provided herein may facilitate such communications.

Other use cases may comprise processing orders, invoices, and statements in multiple accounting systems. Examples may comprise replacing health level seven (HL7), clinical document architecture (CDA), collaborative drug discovery (CDD), or other protocols for structured data exchange in the medical health care industry.

In some cases, the signatures of new addresses that can be verified by each node in the decentralized network can control the creation of new addresses and verify changes of the pseudo-name associated with each address. The pseudo-name may simplify a user's transaction to the sender without the complexities of a 256-bit address number. The pseudo-name may not have to identify the user. The user's signature may make it very difficult, or, in some cases, not possible for other nodes to modify the pseudo-name associated with the user's public address.

In some examples, provided herein are device-specific methods. For example, the creation of new addresses can be controlled by using the device identifier (ID) and the user's password to generate the keypair of the user. In some cases, the user's transactions can only be sent from that specific device of the user. The device-specific method can be used without revealing the identity of the user. The authentication of new addresses may prevent the abuse of new address creations by others.

The signature of the top node in a block of transactions may be verified by each node in the decentralized network. This may establish the validity of the top node's creation of that block to the receiving nodes. Without the top node signature of the new block, any node in the network may be able to create blocks of transactions and send it through the network. The top node's public address may be inherently known to all the member nodes of the network which may be used to verify each new block in the blockchain (the database network system). The binary node path for a block through the network may also be signed by the top node.

The signature of the network software may be configured to be verified and/or to be updated by each node in the decentralized network. This may establish a controlled method to update the network's (the database network system or the blockchain network) software and may validate the ownership of the software update. The network software may be considered a regular blockchain transaction with data that may be encrypted. Alternatively, the data may not be encrypted. The ownership of the network software update transaction may be verified, and the node may update its current network software with the data of the transaction for its further operations on the database network system (or the blockchain). This may integrate the software updates for the network with all the security features of the database network system.

Further provided is a blockchain repository system for software source code with version control that can be private or open source. The blockchain respiratory system may further comprise an option to download the software applications.

Blockchain Database

The database network system may further comprise a database. The database may comprise a blockchain database. The blockchain database may store information in data structures. In some cases, the data structures may comprise or be tables. In some examples, the data structures may come in other shapes or forms.

Data may comprise any data of any type, format and structure. In some cases, data may be of critical importance. Data may comprise confidential data. Data may need to be securely protected. Data may belong to any entity such as any industry, any company, such as an insurance company, a hospital, or a government entity.

The blockchain database provided herein may comprise an application programing interface and may be used for developer applications. Various programming and/or scripting languages may be used to develop new applications, such as the described elsewhere herein. Various programming languages and combinations thereof may be used to develop applications for the database network system and the blockchain database.

Each node in the database network system may participate to provide data to the blockchain database. Each participant may maintain, calculate, and/or update new entries into the blockchain database. A plurality of nodes (in some cases all nodes) may work together to ensure they come to the same conclusions. This may provide in-built security to the database network system and the blockchain database.

The blockchain database may comprise a storage medium. The blockchain database may further comprise a binary insert and search engine. In some cases, the blockchain database may comprise a storage medium, a binary insert and search engine. The binary building block may be presented as the public side of the blockchain database and the storage medium may be provided in private.

The storage medium may comprise any storage medium. The storage medium may comprise memory, hard disk, SSD drive, or other types of hard drives, memory drives or devices. The storage medium may comprise a cloud storage medium. The storage medium may comprise or be a blockchain setup. The storage medium may comprise or be a blockchain storage medium.

The blockchain database may comprise blockchain characteristics. For example, the blockchain database may comprise a storage medium comprising a blockchain setup or a blockchain storage medium. The blockchain storage medium may comprise the features, structures, and security methods described for the database network system presented herein. For example, the blockchain storage medium may comprise data hashing according to the features and methods for the database network system provided herein. Data hashing may facilitate data integrity and/or decentralized data distribution. The blockchain storage medium may comprise procedures and methods for encryption, signing and/or double-signing the data blocks or network applications by a user private key, a user public key, an application private key, and/or an application public key. The blockchain storage medium may comprise decentralized data storage. Decentralized data storage may facilitate immutability. For example, data may be immutable and transparent to all the nodes. The blockchain storage medium described herein may comprise or be a platform for application computing (e.g., secure application computing). The blockchain database may inherently comprise all the features described for the database network system.

In some examples, the blockchain database may comprise, be, and/or provide an additional encryption layer to the database network system. In some cases, the blockchain database may comprise or be a secure back-end network data file system. The database network system described herein may support the blockchain database and may comprise a front-end interface.

The information in the blockchain database, such as the data in the database and the database keys, such as a database private key and a database public key, may be stored on the database network system. When needed, the information in the database (in some cases, all of the information in the database) may be capable of being restored from the database network system, such as in case of data loss or damage for any reason. This feature may provide an additional level of security and additional independence.

In some cases, any entry in the blockchain database is signed. For example, any transaction entry in the blockchain database may be a signed transaction. Signing and/or double-signing transactions may ensure and/or authenticate ownership. Data on the database network system may be encrypted. Data encryption may enhance the security of the database network system and the blockchain database. In some cases, every record of the blockchain database can become a transaction on the database network system. Every record of the blockchain database may be saved as a piece of data on the database network system, and thereby be backed up. The backed-up data may be restored if needed.

The blockchain database may comprise a fast platform for data storage and usage in a decentralized manner. The speed of the blockchain database may be in a similar range as commercial databases. In some cases, the speed of the blockchain database provided herein may be comparable with a centralized database. Examples of commercial databases may comprise MSSQL, MySQL, SQLite, Oracle, and other databases. In some cases, the commercial databases may be centralized and not have the advantages of decentralization. The blockchain database described herein may provide the advantages of decentralization and in some cases may also be more secure than commercial databases or other decentralized databases (in some cases, without compromising speed).

In some cases, the blockchain database described herein may be suitable to be used in or with different forms of software. In some examples, software may be of critical importance. The blockchain database provided herein may be safely used along with such software, and the risks may be minimized using the security measures provided herein.

The database network system and the blockchain database provide herein and/or the combined use of both may provide several advantages over conventional databases. They may provide ownership, security, and decentralization to their uses. Central entities (e.g., corporations, governments, other entities) may be prevented from accessing private user data without permission and/or proper consent by using security mechanisms such as data hashing and end-to-end encryption. Users may create and own their own data. Further, such decentralized systems may not be reliant upon the operation of a single or few majors servers, wherein a problem in the operation of such one or few major servers may prevent proper operation for extended periods of time and/or involve significant data loss.

The database network system and the blockchain database provided herein may comprise a hierarchical model (decentralized consensus algorithm) for decentralized data distribution. The hierarchical model, such as the decentralized consensus algorithm of the blockchain database may provide real-time data back-up. In some cases, multiple operating copies of the database network system and all the data stored in the database may exist and/or be available. In some cases, the blockchain database may ensure real-time backups with multiple operating copies and data access.

The database network system may comprise data hashing. Data hashing may provide independence to the database network system and the blockchain database. The decentralized distribution of data in the database network system may make it possible to recover potential lost data in case a problem occurs. For example, if a node loses some of its data for some reason, such as a hardware failure, an external attack, or any other reason, the node may regain its information and the full blockchain integrity after a reboot. In some cases, corrupted data may be deleted. This may comprise comparing the data on the node which has lost some of its data or has been damaged for any reason with the data hash available on the other nodes on the database network system. The current state of the database network system (e.g., blockchain) may be updated on the mentioned node. This process may stable the node's data integrity, in some cases with little intervention. Therefore, the information on the attacked or damaged node may be restored. The node may be stabilized.

In some cases, the blockchain database described herein may comprise a level of integrity and/or immutability. In some cases, the level of integrity and/or immutability of the blockchain database may be similar to that of the database network system. The blockchain database structure may facilitate application development for software on the database network system (e.g., blockchain). The database network system described here may be safe and secure. In some cases, new applications can be developed using the blockchain database presented herein. In other examples, existing applications may re-interface their data access modules to that of the blockchain database described herein.

In some cases, the data source of the blockchain database may be completely derived from the database network system, and therefore the stability and immutability of the blockchain database may be substantially similar to that of the database network system. The database structure may be re-built from the data on the database network system (e.g., blockchain) when needed. In some cases, the database may have access to adjunction nodes. Alternatively, in some examples, the database may not access adjunction nodes, or the use of adjunction nodes may be optional.

In some cases, a particular address on the database network system may be given a pseudo-name to mask the public address. The pseudo-name may be used to acquire the public address of an account. In some cases, only the owner of the public address may be authorized to change the pseudo-name. This may decrease the probability of the pseudo-name to be manipulated by a third-party. In some cases, the registration of a new public address on the database network system (e.g., the blockchain) may comprise or be a signed (e.g., encrypted) transaction. In some cases, in case a node fails, the indexes associated with the blockchain addresses may be re-built by the blockchain transaction data, such as the data regarding the transactions taking place through the database network system which are available on the database network system. Using adjunct nodes to re-build and/or restore the data may be optional and, in some cases, data may be re-built without using adjunct nodes. Not using adjunct nodes may have the benefit of stabilizing the surrounding index structures of the database network system (e.g., blockchain). In some cases, the surrounding index structures surrounding a node which may need to be repaired and the data of which may need to be restored and/or re-built may be stable. In some cases, the index and the database structure algorithms may be integrated using the methods and systems described herein (e.g., software) and may not depend on an external database to support them. In some cases, the database network system may support the blockchain database. In some cases, the blockchain database may support the database network system. In some cases, the database network system and the blockchain database may be integrated. In some cases, both the database network system and the blockchain database may support one another.

Multiple options may be added from a node's console to copy and update the database network system (e.g., the blockchain), to copy and update the database structures and address indexes, to copy and update the score tree for node distribution, to start and register a new node, to maintain and compare document and database files and/or folders, to register new addresses and do transactions, and to monitor the state and statistics of the database network system (e.g., blockchain). These features may add to the stability of the independence of the nodes.

The systems and methods may provide secure and high-speed digital communication and storage. Examples may include chat, secure email, secure photo sharing, secure web-page access, secure exchange of documents and structured data, secure database applications, secure storage, and transfer of money.

Methods may comprise secure data structure exchange. In some cases, the secure communication methods may be combined with a blockchain database, such as the blockchain database described herein, and present a secure data exchange method. Secure communication methods may comprise keypair authentication, such as private key and public key signing according to the methods described elsewhere herein. Secure communication methods may further comprise user authentication, application authentication, database authentication, network, and software authentication. Each of these authentications may be performed according to the methods provided elsewhere herein. Secure communication methods may further comprise end-to-end encryption. Encryption methods may comprise encryption methods described anywhere herein. Secure communications may provide decentralized data distribution which may comprise immutability, global protocol, fast access, global database applications, a global database (such as the blockchain database provided herein), diverse application scalability, and security features described herein. Secure communications may comprise data hashing. Data hashing may be according to the methods described for the database network system provided herein. Independence stability may be built in the nodes of the network (e.g., the database network system). Methods and systems may comprise self-maintenance, back-ups, data restoring mechanism in case of data loss, and other features. In some cases, secure communications and/or secure communication methods may comprise or have all the features, advantage, and/or benefits of the database network system provided herein. In some cases, secure communication methods may comprise or have all the features, advantage, and/or benefits of the blockchain database described herein. In some cases, secure communication methods may comprise or have all the features, advantage, and/or benefits of the document platform (e.g., the document engine) described herein. In some cases, secure communication methods may comprise the combined features, advantages, and/or benefits described for the database network system, the blockchain database, the document platform, and/or any combination thereof.

Methods may comprise secure structured data exchange. Structured data may be exchanged securely between a plurality of databases. Structured data may be exchanged securely between databases in a manner similar to secure document exchange between the nodes, addresses, or accounts through the database network system as provided herein. The methods described for data distribution across the nodes may also be used to exchange structured data between different databases. Databases may comprise the blockchain database provided herein and other databases, such as commercial databases, conventional databases, centralized databases, decentralized databases, blockchain databases, and/or any other database and various combinations thereof. Structured databases may be exchanged among databases securely.

Decentralized data distribution may comprise distributing structured data between two or more databases. The database network system may comprise a plurality of nodes communicating in a hierarchical construct based on a trusted score assigned to each node of the plurality of nodes. In some cases, the database network system (e.g., the blockchain network) may comprise a plurality of databases. The encryption methods, such as the double-signing method described elsewhere herein may be further used to facilitate secure data exchange among two or more databases.

For example, a user may obtain a keypair to authenticate the exchange of a message or a document to another user with its keypair access (private key and public key described herein). In the case of structured data exchange, a database may obtain a keypair to exchange structured data to another database that may have a keypair. The structured data may be signed, encrypted and written on the database network system (e.g., blockchain) like any other message of document. The database entry may also be made pointing to the structured data on the blockchain. In some cases, the source of the structured data can be verified for acceptance. In some cases, a general mechanism for data exchange may also be proposed. Multiple data structure types may be accommodated over time. The secure standard mechanism of blockchain data exchange may be unaltered.

The secure structured data exchange between databases may give applications more independent freedom and may decrease unfavorable user intervention. Use cases may comprise medical document and data exchange between medical labs and also providers and repositories, monthly statements that update the debtors' databases, inter-company and industry structured data exchanges, and more.

The systems and methods described herein may provide decentralization of front-end user interfaces, as well as decentralization of logic and data access. For example, in some examples, the read access of data may be enhanced by duplicating a node server's data to other node servers globally. In some cases, the data read access may form a portion of an application's data access. In some cases, the front-end user interface (UI) and logic of applications may be distributed to the users' devices, such as user computers, personal computers (PCs), machines, or other devices. The data access of applications may be distributed and decentralized on multiple servers. This may help establish independent and convenient (or affordable) participation of average nodes in data entry, data distribution, and other activities using the database network system.

The methods and systems provided herein may provide an enhanced and/or an efficient data distribution path throughout the decentralized network (e.g., the data distribution path described for the database network system). The hierarchical construct of the database network system may provide a fast, efficient, and secure data distribution path in the database network system, which may increase data write speed. In some cases, a large number of nodes which may be on the database network system may be provided with increased data write speeds and capacities. In some cases, the data write speeds of the nodes of the database network system may be limited by continental latencies. In some cases, continental latencies may be the only limitation to data write speeds. In some examples, data write speeds may be exponential. Exponential data write speeds may be facilitated by the data distribution paths in the database network system provided herein.

In some cases, localized networks of node servers according to the application, interest, use cases, connectivity, and location of the nodes may further enhance the security and decentralization of the data distribution. In some cases, localizing the networks of the node servers may reduce the cost of data entry. Reduced costs of data entry may further benefit the decentralization and the security of the database network system, the blockchain database, the document platform, and/or any combination thereof which may be used for various intents and/or applications. In an example, a local network may communicate with another local network through a connecting network (such as the database network system provided herein). This may introduce a local-global network.

The methods and systems provided herein may facilitate and/or benefit user freedom, such as freedom of speech. In some cases, the methods and systems provided herein may not be susceptible to forking attacks. In some cases, the methods and systems provided herein may comprise no initial transaction distribution. In some cases, the database network system provided herein may not comprise a peer-to-peer network. In some cases, the methods and systems provided herein may be decentralized and the chance of unfavorable centralization may be decreased.

Computer Systems

Figure 2:
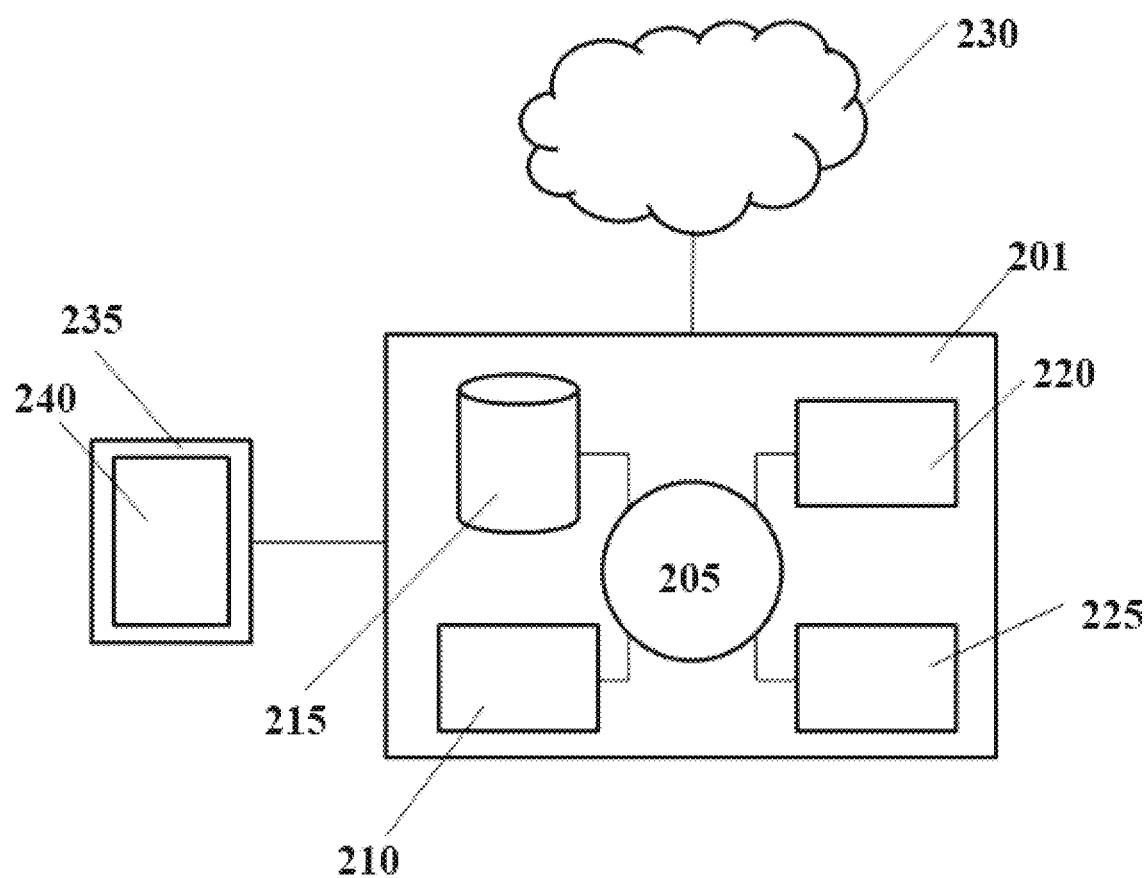
FIG. 2 shows a computer system that is programmed or otherwise configured to implement methods provided herein.

The present disclosure provides computer systems that are programmed to implement methods of the disclosure. FIG. 2 shows a computer system 201 that is programmed or otherwise configured to perform the methods of the present disclosure. For example, the computer system 201 may comprise or be a node participating in the decentralized data distribution systems and methods described herein. The computer system 201 can regulate various aspects of the present disclosure. The computer system 201 can be an electronic device of a user or a computer system that is remotely located with respect to the electronic device. The electronic device can be a mobile electronic device.

The computer system 201 includes a central processing unit (CPU, also "processor" and "computer processor" herein) 205, which can be a single core or multi core processor, or a plurality of processors for parallel processing. The computer system 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The computer system 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 201, can implement a peer-to-peer network, which may enable devices coupled to the computer system 201 to behave as a client or a server. The network 230, in some cases with the aid of the computer system 201, can implement the database network system described herein.

The CPU 205 can execute a sequence of machine-readable instructions, which can be embodied in a program or software. The instructions may be stored in a memory location, such as the memory 210. The instructions can be directed to the CPU 205, which can subsequently program or otherwise configure the CPU 205 to implement methods of the present disclosure. Examples of operations performed by the CPU 205 can include fetch, decode, execute, and writeback.

The CPU 205 can be part of a circuit, such as an integrated circuit. One or more other components of the system 201 can be included in the circuit. In some cases, the circuit is an application specific integrated circuit (ASIC).

The storage unit 215 can store files, such as drivers, libraries and saved programs. The storage unit 215 can store user data, e.g., user preferences and user programs. The computer system 201 in some cases can include one or more additional data storage units that are external to the computer system 201, such as located on a remote server that is in communication with the computer system 201 through an intranet or the Internet.

The computer system 201 can communicate with one or more remote computer systems through the network 230. For instance, the computer system 201 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 201 via the network 230.

Methods as described herein can be implemented by way of machine (e.g., computer processor) executable code stored on an electronic storage location of the computer system 201, such as, for example, on the memory 210 or electronic storage unit 215. The machine executable or machine-readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 201 can include or be in communication with an electronic display 935 that comprises a user interface (UI) 240 for providing, for example, monitoring of sample preparation, monitoring droplet preparation, monitoring reagent addition, monitoring of reactions and/or reaction conditions, monitoring sequencing, results of sequencing, and permitting user inputs for sample preparation, reaction, sequencing and/or analysis, etc. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 205. The algorithm can, for example, implement sample preparation protocols, implement droplet preparation protocols, implement reagent addition protocols, data analysis protocols, perform sequencing protocols, system and/or device operation protocols, etc.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for constructing a database network system from a plurality of nodes for decentralized data distribution, comprising:
    (a) using a plurality of tests, assaying a computing power of each of said plurality of nodes substantially simultaneously, wherein said each of said plurality of nodes receives a different test of said plurality of tests;
    (b) determining a test score for said each of said plurality of nodes based at least in part on said computing power determined in (a);
    (c) determining a trusted score for said each of said plurality of nodes, wherein said trusted score is based at least in part on a sum of said test score and an accumulated trusted score for said each of said plurality of nodes, if any; and
    (d) generating a hierarchical construct of said plurality of nodes, wherein a node of said plurality of nodes in said hierarchical construct is configured to receive a data block from a parent node and distribute said data block to at least two child nodes, wherein said parent node has a higher trusted score than said node and wherein said node has a higher trusted score than each of said at least two child nodes.

2. The method of claim 1, further comprising repeating (a)-(d), wherein said plurality of tests are calculated by said plurality of nodes, wherein two tests of said plurality of tests provided to the at least two child nodes are calculated by said node.

3. The method of claim 1, wherein said trusted score for said node is based at least in part on a given test score for a child node of said at least two child nodes.

4. The method of claim 1, wherein said substantially simultaneously comprises less than 1 second.

5. The method of claim 1, wherein said plurality of tests comprises calculation of a total block hash based on random block numbers.

6. The method of claim 1, further comprising distributing said data block from said parent node to said node, and from said node to said at least two child nodes.

7. The method of claim 6, further comprising validating said data block, by said each of said plurality of nodes, based on one or more trusted scores of one or more nodes in an upstream distribution path of said data block.

* * * * *